United States Patent
Bovey

(10) Patent No.: US 9,959,153 B2
(45) Date of Patent: May 1, 2018

(54) ASSISTING FAILURE DIAGNOSIS IN A SYSTEM

(75) Inventor: Richard Lee Bovey, Filton Bristol (GB)

(73) Assignee: BAE Systems plc, London (GB)

(*) Notice: Subject to any disclaimer, the term of this patent is extended or adjusted under 35 U.S.C. 154(b) by 1657 days.

(21) Appl. No.: 12/937,490

(22) PCT Filed: Apr. 17, 2009

(86) PCT No.: PCT/GB2009/050384
§ 371 (c)(1),
(2), (4) Date: Dec. 27, 2010

(87) PCT Pub. No.: WO2009/136183
PCT Pub. Date: Nov. 12, 2009

(65) Prior Publication Data
US 2011/0099039 A1    Apr. 28, 2011

(30) Foreign Application Priority Data

Apr. 18, 2008  (EP) .................................... 08007614
Apr. 18, 2008  (GB) ................................... 0807077.3

(51) Int. Cl.
*G06F 11/00*  (2006.01)
*G06Q 10/06*  (2012.01)

(52) U.S. Cl.
CPC .......... *G06F 11/008* (2013.01); *G06Q 10/063* (2013.01)

(58) Field of Classification Search
CPC ......... G06F 11/07; G06F 11/008; G06N 5/04; G06Q 10/04; G06Q 10/06375; G06Q 10/063
See application file for complete search history.

(56) References Cited

U.S. PATENT DOCUMENTS 6,535,865 B1    3/2003  Skaaning et al.
7,209,814 B2 *  4/2007  Kipersztok et al. ......... 701/31.6
(Continued)

FOREIGN PATENT DOCUMENTS

EP         1 069 487 A1    1/2001
WO    WO 2004/079637 A1    9/2004

OTHER PUBLICATIONS

Wang Haiqin, 2006, Using Sensitivity Analysis to Validate Bayesian Networks for Airplane Subsystem Diagnosis, IEEE, pp. 1-10.*
(Continued)

*Primary Examiner* — Leland Marcus
*Assistant Examiner* — Stephen S Swartz
(74) *Attorney, Agent, or Firm* — Maine Cernota & Rardin

(57) ABSTRACT

A method of assisting failure diagnosis in a system includes obtaining data including a probabilistic Bayesian Network describing a set of failures, a set of symptoms and probabilities of at least some of the symptoms being associated with at least some of the failures in a system. A cost value representing a cost associated with learning of a presence or absence of the symptom is obtained for at least some of the symptoms, as well as a plurality of information values, e.g. values representing measures of information gained by learning of the presence or absence of the symptom in relation to a respective plurality of the failures, associated with the symptom. The method then computes an information-for-cost value for the symptom based on the cost value and the plurality of information values.

6 Claims, 3 Drawing Sheets

(56) References Cited

U.S. PATENT DOCUMENTS

| | | | |
|---|---|---|---|
| 7,213,174 B2* | 5/2007 | Dahlquist et al. | 714/37 |
| 7,723,050 B2* | 5/2010 | Urdea et al. | 435/7.1 |
| 2001/0011260 A1 | 8/2001 | Skaanning et al. | |
| 2005/0049988 A1* | 3/2005 | Dahlquist et al. | 706/46 |
| 2008/0171916 A1* | 7/2008 | Feder et al. | 600/300 |
| 2009/0024356 A1* | 1/2009 | Platt | G06F 19/345 702/181 |
| 2009/0094076 A1* | 4/2009 | Reddy | 705/7 |

OTHER PUBLICATIONS

Skanning et al. (EP 1069487 A1) discloses an automated diagnosis of printer systems using Bayesian networks.*

International Preliminary Report on Patentability (PCT/IB/373) dated Oct. 19, 2010, for International Application No. PCT/GB2009/050384.

International Search Report (PCT/ISA/210) dated Dec. 4, 2009, by European Patent Office as the International Searching Authority for International Application No. PCT/GB2009/050384.

Written Opinion (PCT/ISA/237) dated Dec. 4, 2009, by European Patent Office as the International Searching Authority for International Application No. PCT/GB2009/050384.

United Kingdom Search Report in GB 0807077.3 dated Aug. 18, 2008.

David Heckerman, et al; "Decision—Theoretic", Communications of the Association for Computing Machinery, ACM, New York, NY, US, vol. 38, No. 3, Mar. 1995, XP-000517418.

Haiqin Wang, Using Sensitivity Analysis to Validate Bayesian Networks for Airplane Subsystem Diagnosis, Aerospace Conference, 2006, IEEE Big Sky, MT, USA Mar. 4-11, 2006, pp. 1 to 10.

* cited by examiner

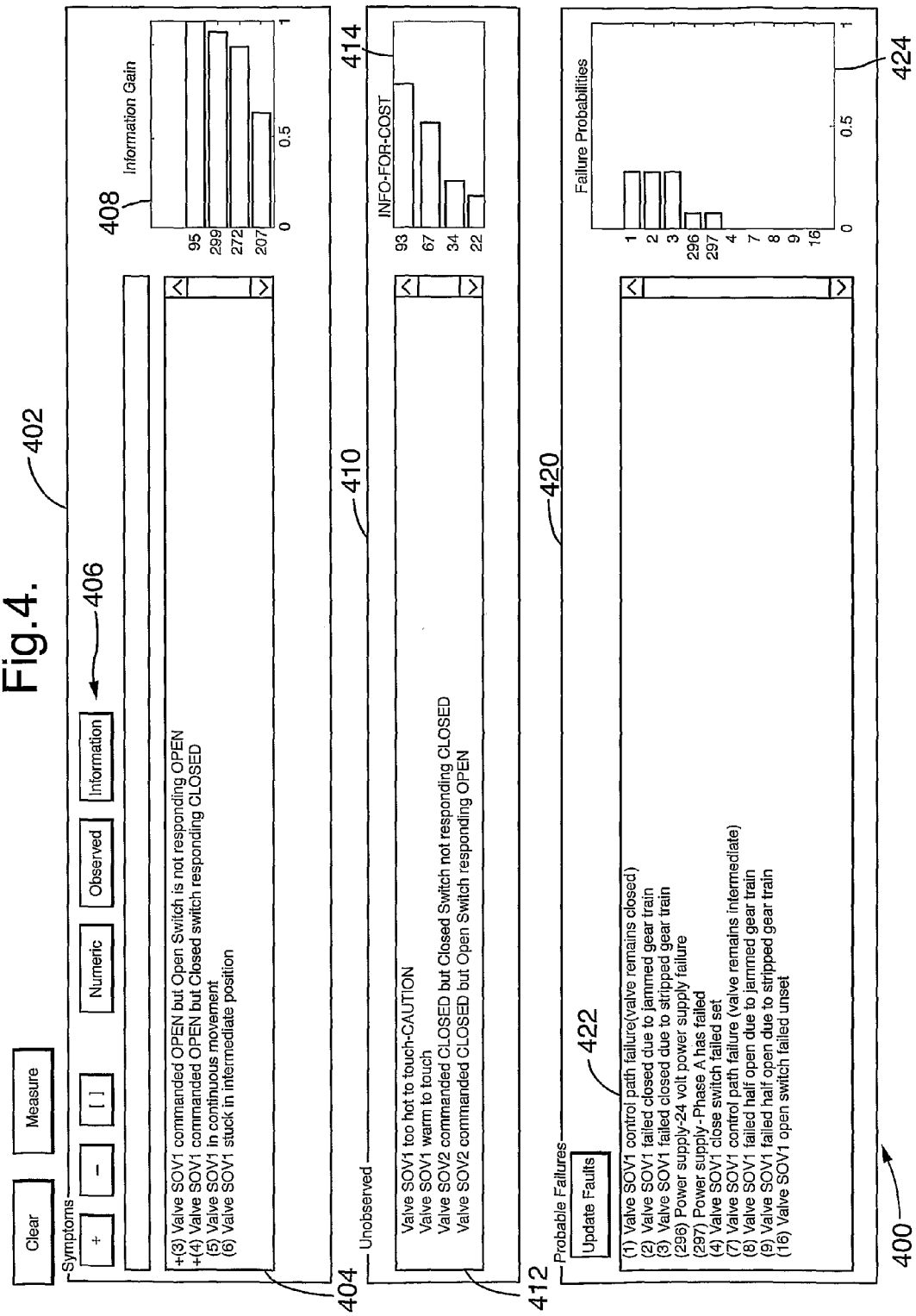

ASSISTING FAILURE DIAGNOSIS IN A SYSTEM

The present invention relates to assisting failure diagnosis in a system.

It is known to use probabilistic Bayesian Networks for diagnosing failures in a system, such as an organised collection of hardware and/or software, which may be a complete structure, e.g. a vehicle, or a set of components that cooperate as part of a larger structure. Typically, a model of the components of the system and the relationships between them is created. States and failure modes of the system components are then identified and a suitable data structure is created that stores information describing the symptom(s) associated with each failure mode, along with the probability of a particular failure mode causing the symptom. The information collected will typically be based on expert knowledge and can be used as the basis for creating a probabilistic Bayesian Network upon which inference can be performed in order to carry out a diagnostic procedure on the system.

Failure diagnosis using Bayesian inference normally involves computing the posterior probability of a failure being present by taking into account evidence based on the presence or absence of particular symptoms and prior probabilities (a description provided when creating the model of the system of what is known about a variable in the absence of evidence). In many types of complex systems, obtaining evidence of symptoms can be time-consuming, labour-intensive and/or involve financial costs. For example, trying to detect the presence of a leak in a pipe located deep within the body of a vehicle can involve having to remove several other components in order to gain access to the pipe. In some cases inspection can require permanent/invasive modification of the surrounding structure, e.g. cutting through a surface. Other factors, such as physical risk, may also be taken into account when calculating the "cost" of inspecting for the presence/absence of a symptom. Some inspections can provide evidence that will help to a greater extent than others in terms of the overall diagnosis, i.e. learning about the presence/absence of a particular symptom may allow more than one possible failure to be eliminated. It is, therefore, possible to carry out a sequence of symptom inspections in an inefficient manner/order that is unlikely to substantially assist with the failure diagnosis. Embodiments of the present application are intended to provide solutions to at least this problem.

Heckerman, D. et al; "Decision-Theoretic" Communications of The Association for Computing Machinery, ACM, New York, N.Y., US, Vol. 38, No. 3, Mar. 1, 1995 discusses a troubleshooting methodology that first computes the probabilities of component faults given that a device is not functioning, and then observing components having the highest computed probability-of-faultiness over cost-of-observation-and-repair ratio.

The method can further include generating a graphical or numerical representation of the information-for-cost value of at least one of the symptoms. The method may include generating a display of the symptoms ordered according to their respective information-for-cost values.

The method can further include performing (or instructing performance of) a plurality of tests intended to detect the presence or absence of a respective plurality of symptoms in an order corresponding to the respective information-for-cost values of the plurality of symptoms.

According to another aspect of the present invention there is provided a computer program product comprising computer readable medium, having thereon computer program code means, when the program code is loaded, to make the computer execute a method of assisting failure diagnosis in a system substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 4 is an example screen display produced by the system failure diagnosis application.

Figure 1:
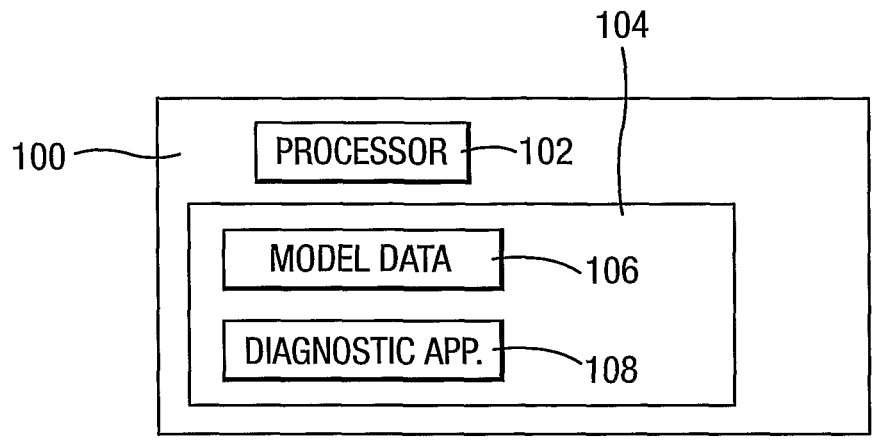
FIG. 1 is a schematic illustration of a computing device configured to execute a system failure diagnosis application.

FIG. 1 is a schematic illustration of a computing device 100 including a processor 102 and an internal memory 104. It will be understood that the computer can include other conventional features, such as a display, user input devices (e.g. a mouse/keyboard), an external memory and network connections.

The memory 104 stores data representing a failure/symptom model 106 and a diagnostic application 108 that can use the model data to diagnose failures in the system. The data 106 may include a probabilistic Bayesian Network and the diagnostic application can perform operations based on Bayesian inference in order to diagnose failures in the system. The skilled person will be familiar with such representations and operations and reference is made to publicly-available software, such as SMILE and GeNie, produced by Decision Systems Laboratory, University of Pittsburgh, USA, that can be used to create Bayesian Network-based model data and perform/implement diagnostic operations of the type performed by the application 108.

The application 108 is further configured to compute "information-for-cost" indications that are intended to denote which symptom(s) would be most beneficial to inspect in the course of the diagnostic operation, thereby assisting with the overall failure diagnosis. To assist with understanding of this aspect of the operation of the diagnostic application 108, reference is made to FIG. 2, which graphically illustrates the relationships between a simple example set of symptoms S1, S2, S3 and failure modes F1, F2. As can be seen, symptom S1 is associated with failure modes F1 and F2; symptom S2 is associated with failure mode F1 only and symptom S3 is associated with failure mode F2 only.

Each unobserved symptom can turn out to be either present or absent. Learning about the presence/absence of a symptom affects the belief in the presence of each associated failure mode. The expected amount of information that observing a symptom provides about a failure mode is the mutual information between the symptom and the failure mode. Examples of these "information values" ($I_{S1\text{-}F1}$, $I_{S1\text{-}F2}$, $I_{S2\text{-}F1}$, $I_{S3\text{-}F2}$) for each associated symptom/failure mode are shown in the Figure.

A cost value is also associated with learning about the presence/absence of each symptom. As mentioned above, the cost value can be based on many factors, such as financial/time-based ones associated with performing an inspection intended to directly/physically establish the presence/absence of the symptom, or other types of costs, such as computations required to provide an estimate of the presence/absence of the symptom. Again, examples of these "cost values" ($C_{S1}$, $C_{S2}$, $C_{S3}$) for each symptom are shown in the Figure.

The total expected information gain for a symptom can be calculated by summing the mutual information of the symptom with each failure and so one way of computing an "information-for-cost" for each symptom in the example is to sum the information values associated with it and divide this sum by the symptom's cost value. Referring to the example of FIG. 2:

S1: Total information value=0.5+0.4=0.9; Information-for-cost=0.9/4=0.225

S2: Total information value=0.6; Information-for-cost=0.6/3=0.2

S3: Total information value=0.4; Information-for-cost=0.4/1=0.4

Therefore, in this example, the symptom having the greatest Information-for-cost value is S3.

Figure 2:
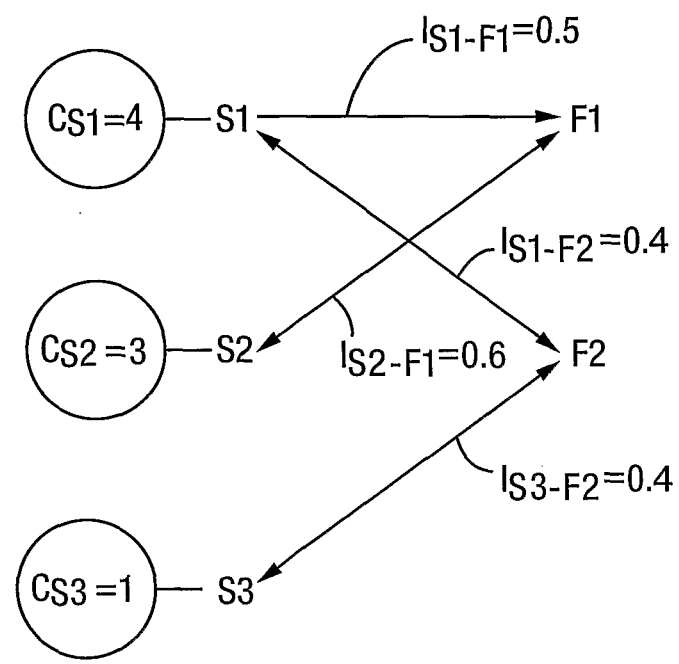
FIG. 2 is a schematic illustration of the relationships between example symptoms and failures in a system.

Instead of considering the mutual information between one failure and one symptom and summing over failures (which ignores the interaction between failures), it is also possible to consider the mutual information between all the failures (i.e. belief in the joint state of all the failures) and each symptom. It might be better to maximise the mutual information of the failure joint distribution with the symptom could be maximised, although in some cases this may not be computationally feasible. Referring to FIG. 2 with examples for the mutual information ($I_J$) between the joint of the failures and the symptoms being S1: 0.2, S2: 0.9, S3: 0.1:

S1: Information value=0.2; Information-for-cost=0.2/4=0.05

S2: Information value=0.9; Information-for-cost=0.9/3=0.3

S3: Information value=0.1; Information-for-cost=0.1/1=0.1

Therefore, in this example, the symptom having the greatest Information-for-cost value is S2.

Figure 3:
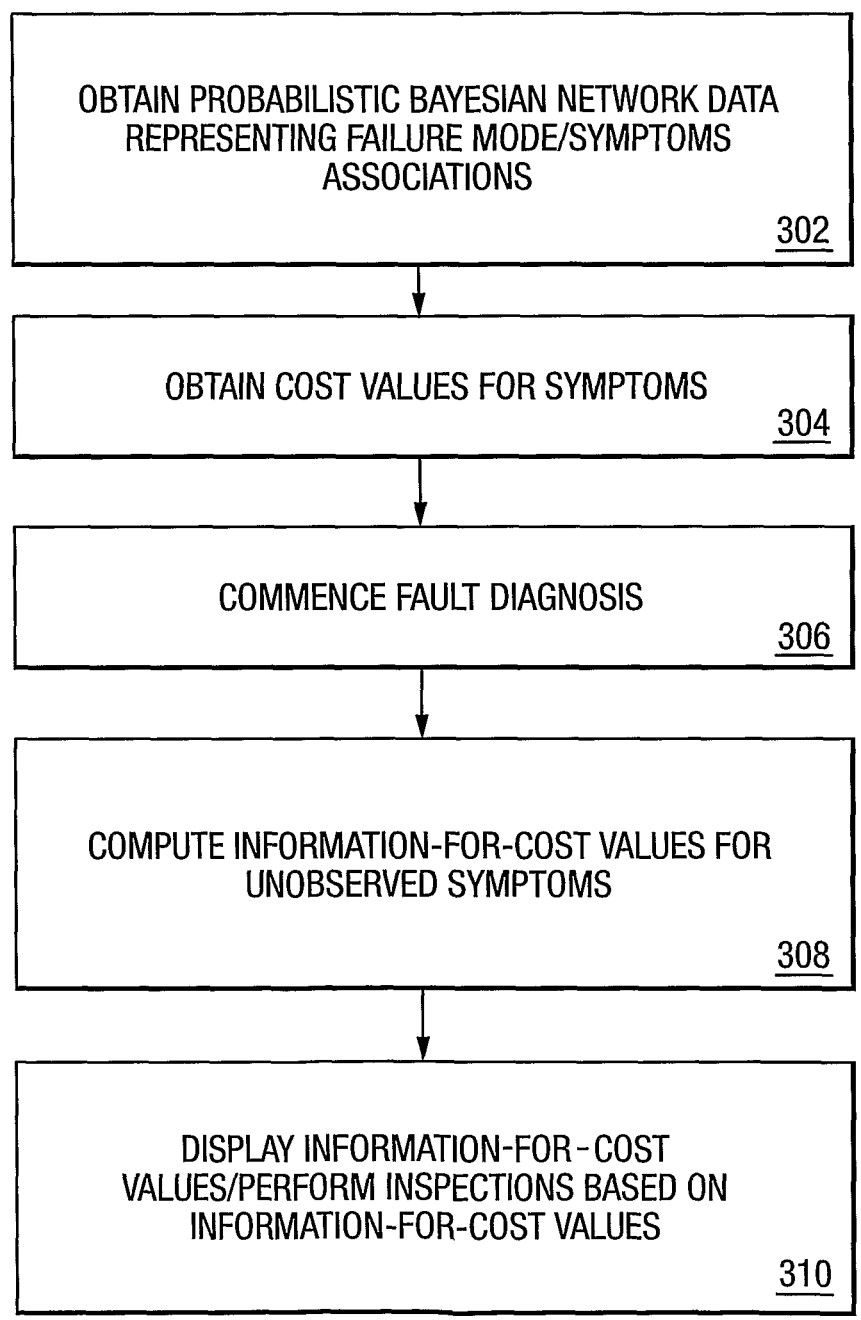
FIG. 3 is a flowchart illustrating an example of steps performed by the system failure diagnosis application.

FIG. 3 illustrates schematically an example of how the diagnostic application 108 can perform diagnostic analysis with an information-for-cost facility. It will be understood that the order in which the steps are performed can vary from the example shown and in some cases some of the steps may be omitted. At step 302 data representing a probabilistic Bayesian Network representing associations between failure modes and symptoms in a system is obtained, e.g. loaded from a file. At step 304 cost values for at least some of the symptoms are obtained. In some cases the cost values may be stored in the same file as the Bayesian Network data, or they may be stored/generated separately.

At step 306 the application 108 is used to perform a failure diagnosis operation. It will be appreciated that the manner of this operation can vary, but it will generally involve the user being given the opportunity to indicate which symptom(s) have been observed, the application performing Bayesian inference to update the probabilities in view of that evidence and the user then being presented with a list of possible failures and/or an indication of which further symptoms can be inspected in order to increase the accuracy of the diagnosis. The application can compute information-for-cost values for symptoms that have not yet been observed so far and either give the user an indication of these so that he/she can use this information in order to choose which symptom's absence/presence should be inspected next, or, if the inspections can be automated/controlled by the application, at least one of the inspections is automatically performed with its result being input as evidence into the application (step 308).

FIG. 4 is an example of the type of screen display 400 that can be generated by the application 108 that includes indications of information-for-cost values. Area 402 includes a list 404 of symptoms and interface buttons 406 that allow a user to input information relating to the symptoms, e.g. indicate if they have been observed or not. The area also includes a graphical/numerical representation 408 of the information gain resulting from data input regarding the symptoms.

Area 410 includes a list 412 of symptoms that have not yet been observed and a graphical/numerical representation 414 of the expected cost-for-information values for each of the symptoms. The unobserved symptoms are ordered according to their cost-for-information values. Area 420 includes a list 422 of possible failures and a graphical/numerical indication 424 of the probabilities of each failure, as computed by the application 108. It will be appreciated that the interface shown is exemplary only and many variations are possible, e.g. a user may only be presented with an information-for-cost value for a particular symptom upon selecting/highlighting that symptom, or the user may be able to search for a particular type of symptom, e.g. a symptom that may be located in a specified area of a structure, and then find out its information-for-cost value.

Providing the information-for-cost values means that failure diagnosis can be carried out more efficiently, resulting in reduced costs and faster failure-finding.

The invention claimed is:

1. A method for diagnosing failure in a structure having plurality of components, the method comprising:
   the observation of one or more symptoms associated with failure in the structure:
   receiving data in respect of the observed symptom(s), the data further including a probabilistic Bayesian Network describing a set of component failures and a set of symptoms; and
   for each of at least some unobserved symptoms of the set of symptoms:
   obtaining a cost value representing a cost associated with learning of a presence or absence of the symptom;
   obtaining one or more information values associated with the symptom;
   the method further comprising:
   determining which symptom among the at least some unobserved symptoms that would be most beneficial to inspect by computing an information-for-cost value based on the cost values, and information values, the information values representing measures of information gained by learning of presence or absence of a respective symptom in relation to a respective plurality of component failures associated with the respective symptom, and wherein the computing the information-for-cost value includes:

summing the information values of said respective symptom to provide a sum;

dividing the sum by the cost value of the respective symptom;

identifying, the respective unobserved symptom to be inspected based on the determination; and inspecting the respective unobserved symptom in the structure.

2. A method according to claim 1, wherein the plurality of information values represents a joint state of a plurality of the component failures and the symptom.

3. A method according to claim 1,

Comprising: generating a graphical or numerical representation of the information-for-cost value of at least one of the symptoms.

4. A method according to claim 1, comprising: generating a display of the symptoms ordered according to respective information-for-cost values which indicate the inspection benefit of an associated symptom.

5. A method according to claim 1,

Comprising: performing, or instructing performance of, a plurality of inspections intended to detect presence or absence of a respective plurality of unobserved symptoms in an order corresponding to respective information-for-cost values of the plurality of symptoms, wherein each information-for-cost value indicates an inspection benefit of an associated symptom.

6. A structure having a plurality of components and including apparatus for carrying out the method of claim 1 in respect of one or more components of the structure assisting fault diagnosis, and having software modules loaded into a computer for configuring the computer, the software modules comprising:

Means for receiving data including a probabilistic Bayesian Network describing a set of failures and a set of symptoms:

for at least some of the symptoms; and means for obtaining a cost value representing a cost associated with learning of a presence or absence of some of the symptoms;

means for obtaining a plurality of information values associated with some of the symptoms; and means for determining which symptom among some of the symptoms that would be most beneficial to inspect based on the cost value and the plurality of information values, the plurality of information values representing measures of information gained by learning of presence or absence of a respective symptom in relation to a respective plurality of failures associated with then respective symptom, and wherein computing the information for cost value includes:

summing the information values of said respective symptom to provide a sum; and dividing the sum by the cost value of the respective symptom.

* * * * *